United States Patent Office 3,284,280
Patented Nov. 8, 1966

3,284,280
RAPID SETTING POLYVINYL ACETATE ADHESIVES
Walter B. Armour, Plainfield, and Walter C. Kania, Colonia, N.J., assignors to National Starch and Chemical Corporation, New York, N.Y., a corporation of Delaware
No Drawing. Filed Sept. 21, 1962, Ser. No. 225,388
7 Claims. (Cl. 161—250)

This invention relates to the preparation of novel, rapid setting adhesive compositions and to the adhesives thus prepared.

It is the object of this invention to provide stable, thermosetting adhesive compositions for the bonding of both porous and non-porous substrates, said adhesives being characterized by their ability to rapidly set, at ambient temperatures, with either wet combining or dry combining techniques. A further object of this invention involves the preparation of adhesives capable of yielding waterproof, high strength bonds which are suitable for exterior applications.

As is known in the art, modern adhesives are prepared from a wide variety of synthetic organic resins, many of which are often blended so as to provide adhesive compositions displaying specific properties desired by the practitioner. Most adhesives are ordinarily classified as being either thermoplastic or thermosetting. Thus, thermosetting adhesives are formulated with resins which, by means of a chemical reaction, solidify or set on heating and cannot be remelted on further heating. Thermoplastic adhesives, on the other hand, are made with resins which may be softened by heat, and then regain their original properties upon cooling.

Among the resins which are used for the preparation of thermosetting adhesives, one may list resorcinol-formaldehyde, melamine-formaldehyde, phenol-formaldehyde, epoxy, and urea-melamine resins. One of the major disadvantages of the thermosetting adhesives derived from such resins is that the substrates to which they are applied must be wet combined; that is the adhesive coated substrates must be brought into contact while the adhesive films are still wet or moist. Moreover, wet combining must also be accompanied by the application of pressure. Thus, typical pressing cycles for the wet combining of thermosetting adhesive coated substrates involve the application of about 100–200 pounds per square inch (p.s.i.) for a period of from 8 to 24 hours at room temperature conditions or for about 10 to 15 minutes at temperatures in the range of 200°–300° F.

Although wet combining presents a few disadvantages in some applications, there are many situations wherein it proves to be a distinct limitation. Obviously, the ability to bond substrates having a dry coating of a previously applied adhesive film would prove to be extremely useful to the practitioner. However, such dry combining techniques cannot be utilized with the majority of the resins presently employed in thermosetting adhesives.

Polyvinyl acetate along with various vinyl acetate copolymers are often employed in the preparation of thermoplastic adhesive compositions. Such adhesives have proven useful for the bonding of porous substrates, such as wood, paper, and leather, intended for use in applications which do not require extensive water resistance. However, when attempts are made to use these adhesives for exterior applications, it is found that the bonds which are obtained with these materials are usually lacking in water resistance. This property is, of course, required for its use in the bonding of substrates which are to be exposed to the excessive moisture and varying temperature conditions encountered during outdoor exposure.

In an attempt to improve the strength and water resistance of the bonds which are obtained with adhesives derived from polyvinyl acetate and is copolymers, they have been combined with various thermosetting materials such as the phenol-formaldehyde resins, etc. Although the water resistance of these combinations is superior to that of ordinary polyvinyl acetate adhesives, they are still not adequate for use in exterior applications.

Another approach which has been utilized in an attempt to improve the setting and processing characteristics of polyvinyl acetate adhesives has involved the hydrolysis of the polymer and the subsequent blending of the hydrolyzed polymer with various thermosetting reactive materials. Thus, for example, U.S. Patent 3,010,919 sets forth the preparation of compositions comprising aqueous solutions of trimethylol phenol in combination with various water soluble polyol compounds, including hydrolyzed polyvinyl acetate. These blends of trimethylol phenol and hydrolyzed polyvinyl acetate have not been entirely satisfactory in industrial applications since their limitation to aqueous solution form has thereby prevented the production of formulations having a high resin solids content. High resin solids content formulations are highly desirable since their use results in adhesives which set at a very rapid rate. Moreover, the use of high resin solids content compositions leads to a considerable economic saving since less adhesive is required in order to achieve the equivalent amount of bonding as compared with low resin solids formulations.

The present invention provides novel adhesive compositions comprising high resin solids formulations of water-insoluble partially hydrolyzed polyvinyl acetate (hereinafter referred to as partially hydrolyzed PVAc) in combination with certain reactive, thermosetting materials. These adhesive compositions overcome all of the deficiencies found in the previously employed combinations of this type, making it possible for the practitioner to use them with wet combining as well as with dry combining techniques at ambient temperatures, while yielding adhesive bonds which display exceptional strength and a high degree of water resistance which is unaffected by outdoor exposure. A surprising feature exhibited by the adhesives of our invention is the rapidity with which they are set or cured with either the wet or dry combining techniques. This rapid setting characteristic can be directly attributed to the high resin solids content of our formulations which the use of water-insoluble partially hydrolyzed polyvinyl acetate in the proces of our invention now makes possible.

In brief, the adhesive compositions of our invention comprise mixtures of an aqueous emulsion of a water-insoluble partially hydrolyzed PVAc together with a reactive, thermosetting material selected from the class consisting of trimethylol phenol, B-stage resorcinol-formaldehyde resins, blends of B-stage resorcinol-formaldehyde resins and trimethylol phenol, and reactive bark derivatives containing water-soluble sulfonate salts of hydroxy aromatic polymeric compounds as prepared by means of the procedure given in U.S. Patent 2,999,108.

The vinyl acetate polymers employed in the adhesives of our invention must be hydrolyzed to the extent that from about 7% to about 21% of the original acetate groups of said polymers have been hydrolyzed to hydroxyl groups. Vinyl acetate polymers hydrolyzed to this degree are water-insoluble but may nevertheless be emulsified, and it is this property which enables us to prepare aqueous adhesive compositions of high resin solids content.

The partially hydrolyzed vinyl acetate polymers utilized in our invention may be prepared by first polymerizing vinyl acetate, employing any of the polymerization techniques well known to those skilled in the art. The resulting vinyl acetate polymer is then partially hydrolyzed by alcoholysis procedures. The partially hydrolyzed PVAc may then be converted to aqueous emulsion form. However, in the preferred embodiment of our invention, we find, it expedient to utilize partially hydrolyzed PVAc which has been prepared by employing PVAc intially polymerized in aqueous emulsion form, thereby eliminating the need for a separate emulsification step.

The adhesive compositions of our invention should contain a resin solids ratio of partially hydrolyzed PVAc to the reactive, thermosetting material of from 99.9:0.1 to 50:50. The total resin solids content of these emulsions will ordinarily be in the range of approximately 30% to 60%, by weight.

The reactive thermosetting material which is combined with the aqueous partially hydrolyzed PVAc emulsion in preparing our adhesive compositions may be selected from any of the above listed materials although we have found that excellent results are obtained with trimethylol phenol. Trimethylol phenol is a white, crystalline non-polymeric phenol having a melting point of 84–86° C. and a molecular weight of 184. When used in the compositions of our invention, these reactive materials are introduced in the form of aqueous systems such as solutions or dispersions. All of these reagents may be broadly described as compounds containing one or more methylol groups.

In preparing our adhesive compositions, it is merely necessary to combine the aqueous emulsion of the partially hydrolyzed PVAc with the selected reactive material. The resulting formulations are found to be extremely stable and may be stored for prolonged periods with no danger of any premature curing or other spoilage.

Prior to the actual use of our adhesives, it is necessary to introduce a catalyst into the formulation so as to accelerate the curing or crosslinking of the adhesive coatings or films which are derived therefrom as well as to enhance the properties of these coatings and films. Among the catalysts which may be utilized for the curing of our adhesive compositions are types of both organic and mineral, i.e., inorganic acids such as hydrochloric, nitric, sulfuric, paratoluene sulfonic, acetic, benzene sulfonic, and trichloroacetic acids; and preferably acid salts of trivalent metals such as chromic nitrate, chromic chloride, aluminum nitrate, aluminum chloride, ferric nitrate, ferric chloride, and chromic complexes such as para-aminobenzoatochromic chloride. These catalysts may be added to our adhesive at the time they are to be used, or, if added earlier, they should not be introduced any sooner than about 24 hours prior to their actual use of these adhesives. As has been noted, the use of acid catalysts, and particularly chromic nitrate, is preferred, since the use of these materials as catalysts accelerates the curing of our compositions to a greater degree than is obtained by the use of free acids.

With regard to proportions, our adhesive compositions may contain from 0.1% to 50%, by weight, of one of the above described thermosetting reactive materials in admixture with from 50% to 99.9%, by weight, of water insoluble partially hydrolyzed PVAc resin solids. The total solids content of our compositions, i.e. reactive material plus partially hydrolyzed PVAc resin solids, is usually in the range of from 30% to 60%, by weight, with the balance of the formulation being water. The amount of acid catalyst which can be used may range from about 0.1–10.0 parts of catalyst per hundred parts of total solids, as defined above. Optimum results are obtained with compositions containing approximately 18%, by weight, of a reactive material, approximately 82%, by weight, of partially hydrolyzed PVAc resin solids, and, where desired, about 5.0 parts of catalyst per 100 parts of the combined weight of the reactive material and the partially hydrolyzed PVAc resin solids.

Our adhesives may be used in the bonding, saturation or lamination of many types of porous substrates such as wood, tempered hardboard, textiles, leather, paper, cement asbestos board and related products, as well as for the manufacture of such products as plywood and wood particle board. One application for which our adhesives have proven to be particularly useful is for the bonding of so-called "finger joints." These finger joints are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking, mating fingers which are subsequently glued together.

Another interesting application for our adhesives involves their use in the construction of laminated beams for arches and other supporting structures wherein lumber is laminated so as to obtain the desired dimensions of the final beam. Our adhesives may also be used in the construction of so-called "curtain wall panels." These panels comprise prefabricated wall panels which are made by binding skin materials such as metals, cardboard, plywood, glass and asbestos board, etc. to cores such as foamed plastics, honecomb cores, insulation board and particle board, etc.

When adhering substrates coated with our compositions, the partitioner may employ either wet or dry combining techniques. When wet combining methods are used, the freshly coated substrates may be adhered at room temperature under pressures of from 30–300 p.s.i. which are applied for periods of from ½–3 hours. By increasing the temperature, both the pressure and the press time will, of course, be reduced proportionately. When dry combining techniques are used, the substrates having dry adhesive films, derived from the compositions of our invention, may be adhered under pressures in the range of 50 to 200 p.s.i., which are applied for periods of from one second to 2 minutes at temperatures of approximately 72° to 150° F. Corresponding reductions in pressures and press times are again achieved by increasing the temperatures.

With either wet or dry combining techniques the adhesive bonds developed with the products of our invention are found to possess exceptionally high strength and outstanding resistance to water. Our adhesives may thus be employed in all applications, including those requiring outdoor exposure and/or a high degree of water resistance.

The following examples will further illustrate the embodiment of our invention. In these examples all parts given are by weight unless otherwise noted.

*Example I*

This example illustrates the preparation of the adhesives of our invention and also demonstrates the high quality of the adhesive bonds which are obtained through their use.

In preparing a typical adhesive composition of our invention, we blended 100 parts of an aqueous emulsion containing 50%, by weight, of polyvinyl acetate resin solids wherein 15% of the acetate groups had been hydrolyzed to hydroxyl groups, together with 70 parts of a 70%, by weight, aqueous solution of trimethylol phenol. The resulting formulation was found to be extremely stable as samples were maintained for periods of up to 12 weeks without any evidence of gellation or other deterioration. Immediately prior to its use, we added 8.5 parts of a 50%, by weight, aqueous solution of chromic nitrate to 100 parts of the above described adhesive mixture. The catalyzed adhesive was then applied, in a 6 mil wet film, to one surface of a number of 1/16" thick birch wood veneers. Three of these veneers were then compressed for three hours under a pressure of 75 p.s.i. and a temperature of 75° F. so as to result in the formation of a three ply panel, part of which was then cut into 1″ x 3¼″ test specimens which were, of course, ³⁄₁₆″ thick. These specimens were then aged for seven days prior to their being subjected to the tests described below.

In order to demonstrate the strength and water resistance of our adhesive bonds, a number of these 1″ x 3¼ x ³⁄₁₆″ 3 ply specimens were immersed in boiling water for four hours whereupon they were placed in a drying oven set at a temperature of 145° F. for a period of 20 hours. They were then immersed in boiling water for an additional four hours after which the water was cooled to 72° F. by the addition of cold water. While still wet, the tensile shear strength, in p.s.i., of the adhesive bonds of these plywood test specimens was determined using an Instron Tensile Tester at a rate of shear of 0.2 inch per minute. Following the tensile sheer strength determinations, the test specimens were examined so as to determine their percent of wood failure. The percent of wood failure indicates what percentage of the total area of the wood surface, at the interface with the adhesive film, was torn while being subjected to the tensile shear determination. Thus, a high percentage of wood failure indicates a strong adhesive bond since the wood rather than the adhesive bond has been torn.

The results of these tests were as follows:

Tensile shear strength, p.s.i. _____ 212
Average percent wood failure _____ 50
Minimum percentage wood failure _____ 30

The above described test procedure conforms to the cyclic boil test for Type I hardwood plywood as established by the U.S. Department of Commerce commercial standard CS35–61 which is used to evaluate commercial grades of hardwood plywood and is also used in setting up adhesive requirements for applications other than plywood, i.e. curtain wall panels, finger joints, and laminated beams, etc. The standards established for this test set up the following scale for comparing the percent wood failure for a specific range of tensile shear strengths:

| Tensile Shear Strength (p.s.i.) | Minimum Percent Wood Failure | Average Percent Wood Failure |
|---|---|---|
| Under 250 | 25 | 50 |
| 250–350 | 10 | 30 |
| Above 350 | 10 | 15 |

Thus, it is to be noted that the average percent wood failure which was obtained with the plywood specimens bonded with our adhesive equalled both the minimum and average standards for this type of product.

The remainder of the 3 ply panel, whose preparation is described above, was then cut into 6″ x 6″ test specimens which were, of course, ³⁄₁₆″ thick. These specimens were aged for seven days and then subjected to 15 test cycles as described in the cold soak test for Type II hardwood plywood as established by the U.S. Department of Commerce commercial standard CS35–56. Each of these cycles required the immersion of the plywood specimens for four hours in water which was at a temperature of 72° F., followed by air drying, at the same temperature, for a period of 20 hours. According to the standards established for this test, a satisfactory specimen must pass 10 to the 15 cycles without any visible delamination between any two layers of veneer which is greater than 2″ in continuous length and over ⅛″ in depth at any point. We obtained results wherein 100% of the specimens tested passed 10 of the 15 test cycles without any visible signs of delamination. These results indicate the high strength of our adhesive bonds.

*Example II*

This example illustrates the use of polyvinyl acetates hydrolyzed to varying degrees in the preparation of the adhesive formulations of our invention and also demonstrates the high quality of the adhesive bonds which are obtained through their use.

The compositions set forth in this example were formulated by preparing 50% resin solids emulsions of PVAcetates possessing various degrees of hydrolysis. These PVAc emulsions were then blended with varying proportions of a 70%, by weight, aqueous solution of trimethylol phenol. Immediately prior to their use, we added varying proportions of 50%, by weight, aqueous solution of chromium nitrate to 100 parts of each of the above described adhesive mixtures. These compositions are set forth in the following table:

| Formulation No. | Components | | | |
|---|---|---|---|---|
| | PVAc | | Trimethylol phenol solution | Chromium nitrate solution |
| | Parts | Percent hydrolysis | | |
| 1 | 100 | 7 | 48.0 | 7.5 |
| 2 | 100 | 15 | 18.0 | 6.0 |
| 3 | 100 | 15 | 0.5 | 5.0 |
| 4 | 100 | 21 | 30.8 | 6.5 |

The adhesive formulations set forth in the preceding table were used to prepare 3 ply birchwood plywood by means of the procedure described in Example I. The adhesive bonds of the resulting plywood displayed high strength and excellent water resistance. Thus, for example, when samples of the plywood were subjected to the cyclic boil test for Type I hardwood plywood and to the cold soak test for Type II hardwood plywood, according to the U.S. Department of Commerce commercial standard CS35–56 (see Example I for description of these test procedures), the following results were obtained:

| Formulation No. | Cyclic Boil Test | | Cold Soak Test |
|---|---|---|---|
| | Tensile Shear Strength (p.s.i.) | Percent Wood Tear | |
| 1 | 212 | 65 | Passed 15 cycles without delamination. |
| 2 | 245 | 100 | |
| 3 | 220 | 55 | |
| 4 | 250 | 60 | |

*Example III*

This example illustrates the use of our adhesive compositions in a dry combining technique and also demonstrates their rapid setting properties.

We blended 100 parts of an aqueous emulsion containing 50%, by weight, of PVAc resin solids wherein 15% of the acetate groups had been hydrolyzed to hydroxyl groups, together with 70 parts of a 70%, by weight, aqueous solution of trimethylol phenol and 1 part of a 50%, by weight, aqueous solution of chromic nitrate. A ¹⁄₆₄″ wet film of this formulation was spread on the opposing surfaces of two 6″ x 6″ x ¹⁄₁₆″ sheets of birchwood plywood. These films were allowed to air dry at 75° F. for a period of 2 hours. The adhesive coated plywood sheets were then placed together and pressed, at 250° F., for a period of only one minute. A similar laminate was also prepared and pressed at room temperature for a period of 5 minutes. In both cases, excellent bonding was obtained as was evidenced by the fact that the laminate required tearing of the wood in order to separate the two sheets. Moreover, after aging for one week the water resistance of these laminates was well beyond the minimum standards established for the cyclic boil test for Type I hardwood plywood as well as for the cold soak test for Type II hardwood plywood as described in Example I.

Example IV

This example illustrates the use of a variety of catalysts and reactive thermosetting materials in the adhesive formulations of our invention.

Below are listed a number of catalysts and a number of reactive materials which were substituted, respectively, for the chromic nitrate and trimethylol phenol used in the adhesive formulation of Example I and in the same proportions as set forth in Example I. Each of the adhesive formulations prepared with these equivalent materials was employed in the preparation of birch wood plywood specimens which were all comparable in their properties to the product described in Example I.

*Catalysts.*—Ferric nitrate, aluminum chloride, paratoluenesulfonic acid, paraaminobenzatochromic chloride.

*Reactive materials.* — B-stage resorcinol-formaldehyde resins, blends of B-stage resorcinol-formaldehyde resins and trimethylol phenol, and reactive bark derivatives containing water soluble sulfonate salts of hydroxy aromatic polymeric compounds.

Example V

This example compares the water resistance of the films derived from our adhesive compositions with that of the films derived from conventional thermosetting adhesives.

Below are listed the adhesives which were compared:

| Formulation No. | Parts | | | |
|---|---|---|---|---|
| | 1 | 2 | 3 | 4 |
| A polyvinyl acetate homopolymer aqueous emulsion with a resin solids content of 50%, by weight | 80 | | | |
| A 98:2 vinyl acetate:cyanoethyl half ester of maleic acid aqueous emulsion copolymer having a resin solids content of 50%, by weight | | 80 | | |
| A solution in a 85:15 methanol:water mixture of a vinyl acetate polymer wherein 31% of the acetate groups had been hydrolyzed to hydroxyl groups (resin solids content=9.9% by weight) | | | 80 | |
| A vinyl acetate aqueous emulsion polymer of which 21% of the acetate groups had been hydrolyzed to hydroxyl groups with a resin solids content of 50%, by weight | | | | 80 |
| A 70%, by weight, aqueous solution of trimethylol phenol | 20 | 20 | 4.7 | 20 |
| Chromic nitrate | 5 | 5 | | 5 |
| Phosphoric acid (85%) | | | 0.85 | |

Each of these formulations was used in the preparation of birch wood plywood panels by means of the procedure described in Example I. However, when subjected to the cyclic boil test for Type I hardwood plywood and the cold soak test for Type II hardwood plywood, it was noted that only the plywood which had been bonded with Formulation #4, i.e., the adhesive of our invention, succeeded in passing both tests whereas the plywood which had been bonded with Formulations #1, 2 and 3 did not pass either test. Moreover, Formulation #3 did not develop a bond of sufficient strength after the 3 hour press cycle to enable the plywood to be further handled or processed. The particularly poor results obtained with Formulation #3 demonstrates the necessity of utilizing water-insoluble partially hydrolyzed PVAc in aqueous emulsion from rather than using water soluble partially hydrolyzed PVAc solutions.

Example VI

This example illustrates the rapid setting properties of our novel adhesives in comparison with conventional thermosetting adhesives.

Below are listed a number of adhesive formulations which were prepared.

| Formulation No. | Parts | | | |
|---|---|---|---|---|
| | 1 | 2 | 3 | 4 |
| A vinyl acetate aqueous emulsion polymer of which 21% of the acetate groups had been hydrolyzed to hydroxyl groups with a resin solids content of 50%, by weight | 100 | | | |
| A solution in a 85:15 methanol: water mixture of a vinyl acetate polymer wherein 31% of the acetate groups had been hydrolyzed to hydroxyl groups (resin solids content=9.9% by weight) | | 100 | | |
| A 70%, by weight, aqueous solution of trimethylol phenol | 16 | 5.9 | | |
| Chromic nitrate | 5 | | | |
| Phosphoric acid (85%) | | 0.9 | | |
| A resorcinol-formaldehyde resin aqueous dispersion having a resin solids content of 50% by weight [1] | | | 100 | |
| Paraformaldehyde (catalyst) | | | 5 | |
| A melamine-formaldehyde resin aqueous dispersion having a resin solids content of 50% by weight [2] | | | | 100 |

[1] In the preparation of the resorcinol-formaldehyde resin, 2500 parts of resorcinol were mixed with 500 parts of a 37% aqueous formaldehyde solution and heated with stirring to about 100° C. to form a homogeneous solution. An additional 750 parts of a 37% aqueous formaldehyde solution were then slowly added with vigorous stirring. After the formaldehyde had been added, 15 parts of oxalic acid were introduced, and the product was then diluted with 2,600 parts of water.

[2] In the preparation of the melamine-formaldehyde resin, 3 moles of formaldehyde were reacted with 1 mole of melamine in an aqueous solution. After a reaction period of 1 hour, the product was dried. Prior to use, the dried product was dispersed in water and 10%, by weight, of wood flour was added.

A 6 mil wet film from each of Formulations #2, 3 and 4 was then applied to both surfaces of five 6" x 6" x 1/16" birch wood veneers while a 6 mil wet film from Formulaion #1 was applied to only one surface of five birch wood veneers of similar dimensions. After being allowed to air dry for five minutes, the four sets of five veneers which were bonded, respectively, with the adhesives of Formulations #1, 2, 3 and 4, were then mated and pressed for thirty minutes at a pressure of 100 p.s.i. and a temperature of 72° F., i.e., room temperature.

After being removed from the press, it was noted that the five veneers coated with Formulation #1, i.e., the adhesive of our invention, had been securely laminated into a solid structure which was readily handled without any danger of delamination. After seven days this laminate withstood the cyclic boil test for Type I hardwood plywood as well as the cold soak test for Type II hardwood plywood.

In contrast, when the veneers which had been coated with Formulations #2, 3 and 4 were removed from the press, it was noted that, in each case, there was a complete absence of bonding between the individual veneers. Moreover, it was found that in order to achieve room temperature bonding comparable to that obtained with Formulation #1, it was necessary, in the case of Formulation #3, to retain the veneers in the press for at least 8 hours. In the case of Formulation #4, a room temperature cure could not be obtained and it was necessary to press these veneers for ½ hours at a temperature of at least 200° F. in order to achieve bonding. As far as Formulation #2 was concerned, the bond obtained after a press time of 24 hours failed to meet the minimum standards established for the cyclic boil test for Type I hardwood plywood as well as for the cold soak test for Type II hardwood plywood as described in Example I. The particularly poor results obtained with Formulation #2 again demonstrates the necessity of utilizing water-insoluble partially hydrolyzed PVAc in aqueous emulsion form rather than using water soluble partially hydrolyzed PVAc solutions.

Although the process of our invention has been limited to the use of hydrolyzed PVAc, it should be noted that comparable formulations may also be prepared utilizing hydrolyzed copolymers of vinyl acetate with other ethylenically unsaturated comonomers such as vinyl chloride, vinylidene chloride, alkyl esters of fumaric acid, alkyl esters of maleic acid, alkyl esters of acrylic acid, alkyl esters of methacrylic acid, and the like.

Summarizing, our invention is thus seen to provide novel, rapid setting thermosetting adhesive compositions capable of yielding high strength, water resistant bonds suitable for exterior applications. Variations may be made in proportions, procedures, and materials without departing from the scope of this invention as defined by the following claims.

We claim:

1. An aqueous adhesive composition comprising a mixture of an emulsion of a water-insoluble partially hydrolyzed polyvinyl acetate together with trimethylol phenol; wherein said partially hydrolyzed polyvinyl acetate contains from about 7 to about 21% of hydroxyl groups, as based on the original number of acetate groups in the polymer.

2. The adhesive composition of claim 1 wherein said composition contains from 50% to 99.9%, by weight, of partially hydrolyzed polyvinyl acetate resin solids, and from 0.1% to 50%, by weight, of trimethylol phenol, the total solids content being about 30% to 60%, by weight, of the total composition.

3. The adhesive composition of claim 1 wherein catalyst is present in an amount ranging from 0.1 to 10 parts per 100 parts of the combined total weight of trimethylol phenol and the partially hydrolyzed polyvinyl acetate resin solids, said catalyst being selected from the group consisting of hydrochloric acid, nitric acid, sulfuric acid, paratoluene sulfonic acid, acetic acid, benzene sulfonic acid, trichloroacetic acid, and acid salts of trivalent metals.

4. An aqueous adhesive composition comprising a mixture of from 50% to 99.9%, by weight, of water-insoluble partially hydrolyzed polyvinyl acetate resin solids which are in aqueous emulsion form, and from 0.1% to 50%, by weight, of a reactive, thermosetting material consisting of trimethylol phenol; wherein said partially hydrolyzed polyvinyl acetate contains from about 7 to about 21% of hydroxyl groups, as based on the original number of acetate groups in the polymer.

5. A wooden laminate comprising at least two laminae which are adhesively bound with a film consisting of a dried residue of an aqueous adhesive composition comprising a mixture of an emulsion of a water-insoluble partially hydrolyzed polyvinyl acetate together with trimethylol phenol; wherein said partially hydrolyzed polyvinyl acetate contains from about 7 to about 21% of hydroxyl groups, as based on the original number of acetate groups in the polymer.

6. A wooden subtrate coated with a film consisting of a dried residue of an aqueous adhesive composition comprising a mixture of an emulsion of a water-insoluble partially hydrolyzed polyvinyl acetate together with trimethylol phenol; wherein said partially hydrolyzed polyvinyl acetate contains from about 7 to about 21% of hydroxyl groups, as based on the original number of acetate groups in the polymer.

7. A porous wooden substrate saturated with an adhesive binder consisting of a dried residue of an aqueous adhesive composition comprising a mixture of an emulsion of a water-insoluble partially hydrolyzed polyvinyl acetate together with trimethylol phenol; wherein said partially hydrolyzed polyvinyl acetate contains from about 7 to about 21% of hydroxyl groups, as based on the original number of acetate groups in the polymer.

References Cited by the Examiner

UNITED STATES PATENTS

| | | | |
|---|---|---|---|
| 2,424,110 | 7/1947 | Morrison et al. | 260—29.6 |
| 2,448,638 | 9/1948 | Murray et al. | 260—29.4 |
| 2,902,458 | 9/1959 | Teppema | 260—29.3 |
| 3,010,919 | 11/1961 | Mackinney et al. | 260—58 |
| 3,041,301 | 6/1962 | Armour | 260—29.3 |

WILLIAM H. SHORT, *Primary Examiner.*

JAMES A. SEIDLECK, *Examiner.*

J. NORRIS, *Assistant Examiner.*